United States Patent Office 3,550,224
Patented Dec. 29, 1970

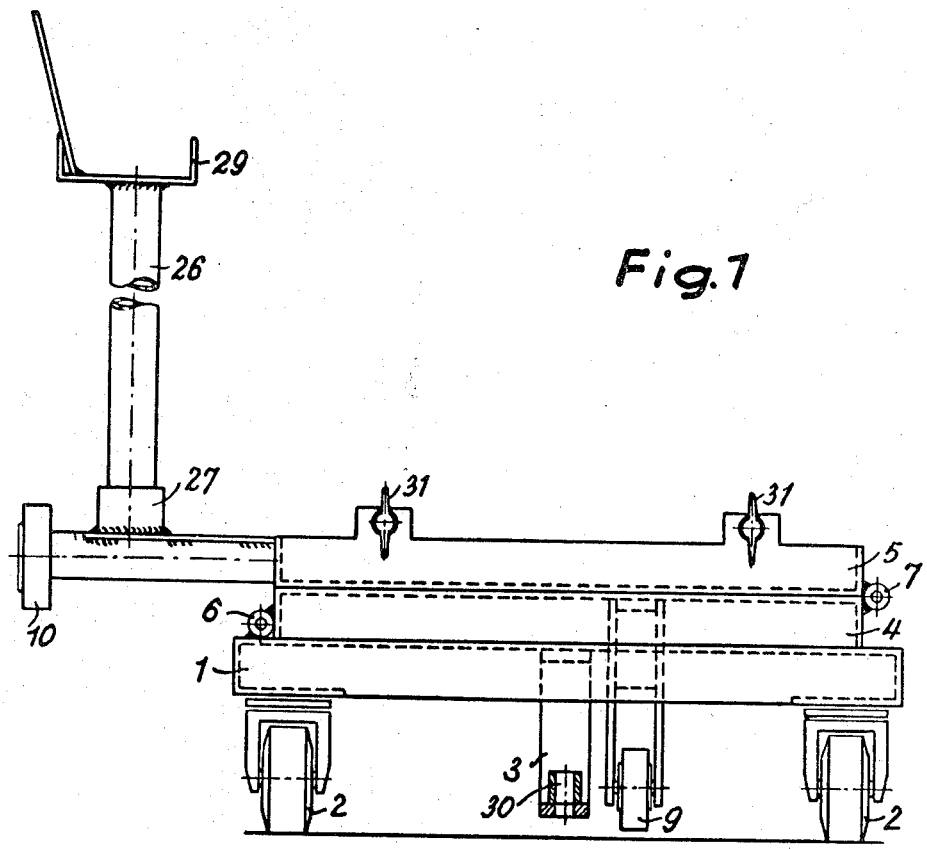
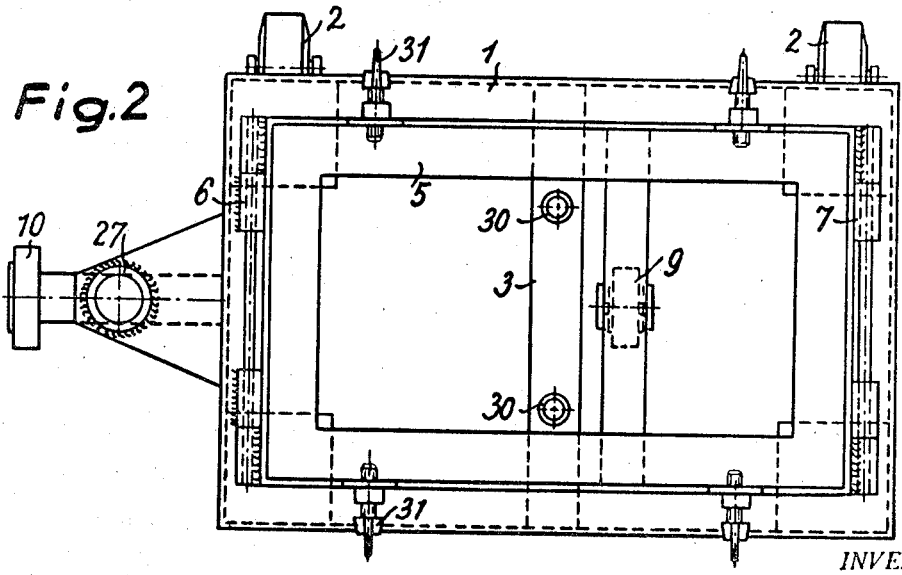

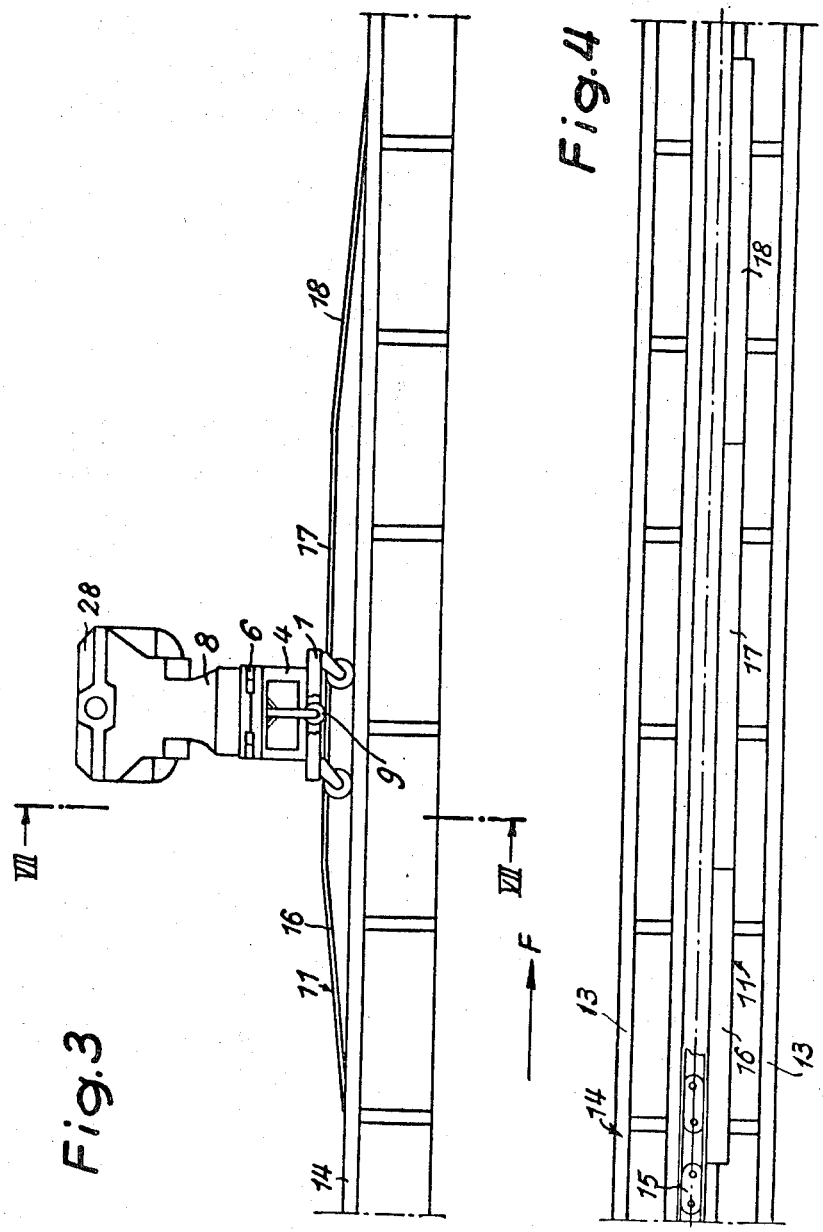

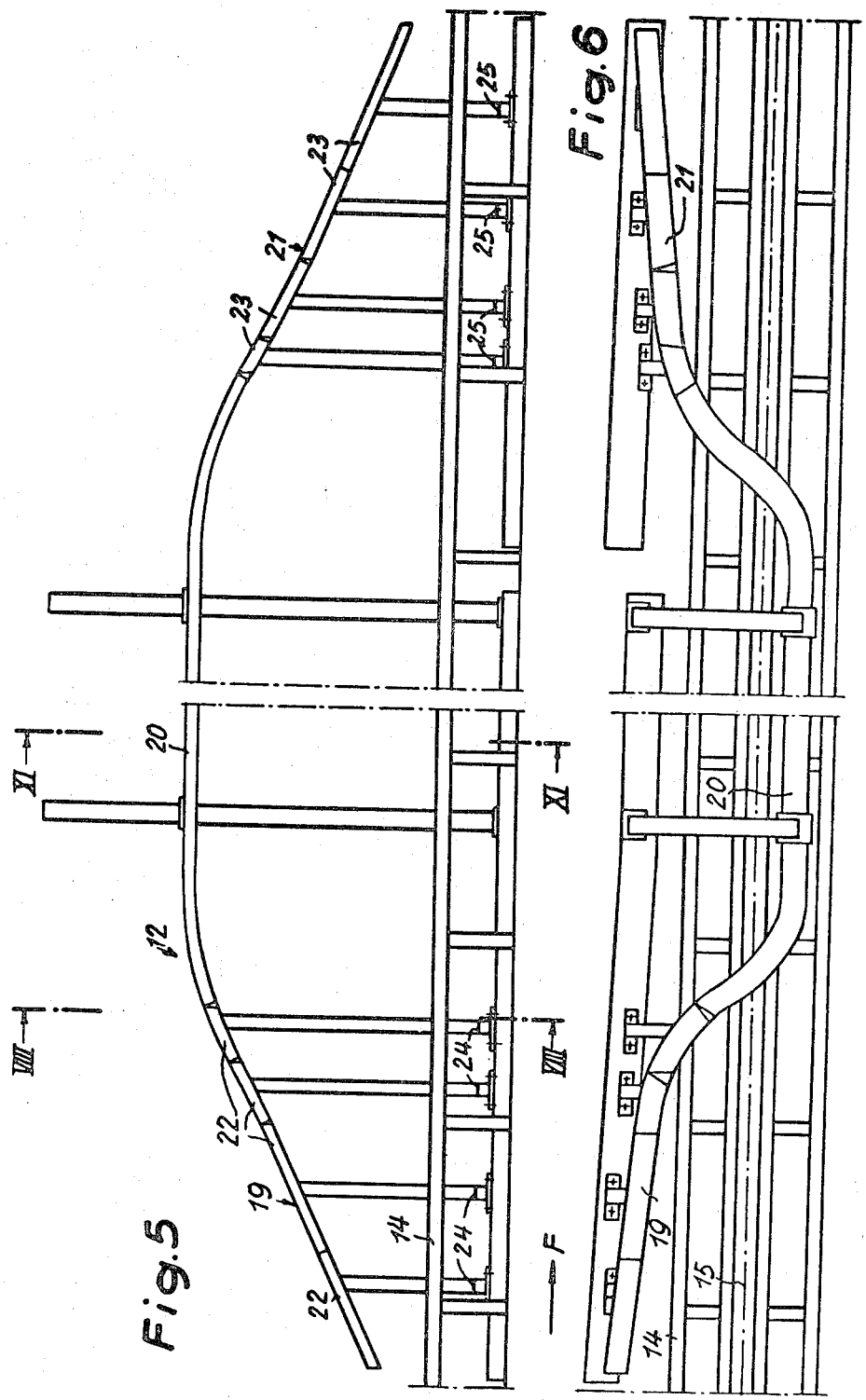

3,550,224
APPARATUS FOR MOLDING CERAMIC ARTICLES
Erwin Gram, Wilhelmsburg, Peter Kastl, St. Polten, and Josef Schretzmayer, Wilhelmsburg, Austria, assignors to Ospag, Osterreichische Sanitar-Keramik- und Porzellan-Industrie Aktiengesellschaft, Vienna, Austria
Filed Apr. 30, 1968, Ser. No. 725,438
Claims priority, application Austria, July 7, 1967,
A 6,368/67
Int. Cl. B28b 1/26
U.S. Cl. 25—29
4 Claims

ABSTRACT OF THE DISCLOSURE

Apparatus for molding ceramic articles, such as toilet bowls and the like, embodying improved means for tilting the mold while being transported by a carriage in order to remove all excess slip from the mold after the latter has been drained by removal of a bottom plug.

---

This invention relates to the manufacture of ceramic articles, such as toilet bowls and the like, and, more specifically to novel and improved apparatus which facilitates removal of excess slip from the mold after it has been drained by the removal of a bottom plug.

While the invention is generally applicable to the fabrication of ceramic articles of all types, it is particularly useful in the formation of toilet bowls since a toilet bowl includes a trap, and in many cases a concave pan, which prevents the draining of all excess slip merely by removal of a bottom plug. Known processes for the removal of excess slip involve the use of suction pipes, but this procedure requires relatively complicated apparatus and generally results in deformation of the mold either because the suction pipe actually touches the ceramic material deposited on the inner face of the mold or because all of the excess slip is not removed. In either case reworking of the molded articles is required.

The apparatus in accordance with this invention overcomes the aforementioned disadvantages of prior known processes and provides a novel and improved arrangement and an organization of elements which enables the complete removal of all excess slip without deforming the ceramic article in any way.

Another object of the invention resides in novel and improved carriage and transporting means to effect the complete removal of excess slip from ceramic molds for the formation of toilet bowls and other similar articles.

A still further object of the invention resides in a novel and improved carriage for transporting molds for toilet bowls which facilitates removal of all excess slip.

The above and other objects of the invention will become more apparent from the following description and accompanying drawings forming part of this application.

In the drawings:

FIG. 1 is an end elevational view of one embodiment of a carriage in accordance with the invention;

FIG. 2 is a plan view of the carriage shown in FIG. 1;

FIG. 3 is a side elevational view of the carriage shown in FIG. 1 in position on transporting means in accordance with the invention;

FIG. 4 is a plan view of the transporting apparatus illustrated in FIG. 3;

FIG. 5 is a side elevational view of another section of the transporting apparatus in accordance with the invention;

FIG. 6 is a plan view of the transporting apparatus illustrated in FIG. 5;

Figure 7:
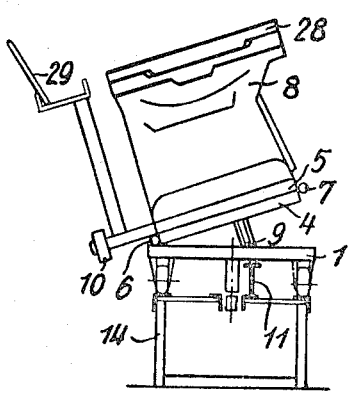
FIG. 7 is a cross-sectional view of FIG. 3 taken along the line VII—VII thereof.

For the purposes of illustration, the invention will be described in connection with the manufacture of ceramic toilet bowls, through it will become apparent as the description proceeds that the invention is useful with the manufacture of other types of ceramic articles.

Broadly, the invention pertains to an improved carriage and transporting means for molds in the manufacture of ceramic articles which includes means for tilting the molds to remove excess slip after the molds have been drained by removal of a bottom plug. More specifically, the improved carriage embodies a base provided with a pair of overlying frames supported by the base with the bottom frame being hinged along one axis to the base and the two frames being hinged, one to the other, along a second axis parallel to the first axis. With this arrangement, a mold carried by the upper frame can be tilted in two directions relative to a horizontal plane and by securing the mold to the upper frame can be tilted through angles of at least 90° on each side of a vertical plane.

The tilting apparatus in the illustrated embodiment of the invention involves cooperating means associated with the track on which the carriage is supported and the nature of the tilting means is determined by the degree of tilt required. In the present case, one tilting means is in the form of a vertically curved element disposed between the carriage supporting rails and operates to tilt both frames in one direction relative to the carriage base. Tilting of the upper frame in the opposite direction is accomplished by a curved channel shaped track which engages a roller carried by the upper frame. By properly curving the U-shaped track, any desired degree and rate of tilt can be obtained.

More specifically, the carriage which is illustrated in FIGS. 1 and 2 includes a base 1 having four wheels on the underside thereof for engagement with the track 14 having parallel rails 13. The base 1 carries a first or lower frame 4 secured to the base 1 by a pair of hinges 6 so that the frame 4 can be tilted relative to the base 1. A second or upper frame 5 is secured to the lower frame 4 by a pair of hinges 7 which permits the upper frame to be tilted relative to the lower frame 4 and the base 1 in a direction opposite of the tilting of the frame 4. The hinges 6 and 7 are generally parallel to the direction of motion of the carriage along the track 14. The upper frame 5 of the carriage includes a plurality of fastening devices 31 for securing a mold, generally denoted by the numeral 8, firmly in position on the frame 5.

The base 1 of the carriage carries a transverse bracket 3 having a pair of downwardly extending sleeves 30 for threadably receiving bolts to couple the carriage to drag chains 15 disposed between the rails 13. The frame 4 includes a downwardly extending bracket carrying a roller 9 on the lower end thereof which engages a curved rail to tilt the frame 4 relative to the base 1. The upper frame 5 carries an outwardly extending arm terminating in a roller 10 for engagement with suitable means for tilting the frame 5 about the hinges 7.

The first tilting motion is illustrated more clearly in FIGS. 3, 4, and 7. In these figures, it will be observed that a track or guideway 11 is disposed between the rails 13 and includes an ascending section 16 when viewed in the direction of the arrow F, a substantially horizontal section 17 and a descending section 18. A roller 9 carried by the carriage base 1 engages the track 11 and in so doing tilts the mold 8 to the left, as viewed in FIG. 7. Since the toilet bowl being formed in the mold 8 includes a pan or concave portion, the excess slip remaining in this concave portion will be transferred to the trap in the lower section of the mold 8. The mold 8 is maintained in the inclined position for a sufficient period to permit complete drainage of the pan whereupon it is then returned to a horizontal position by the descending track portion 18.

Figure 8:
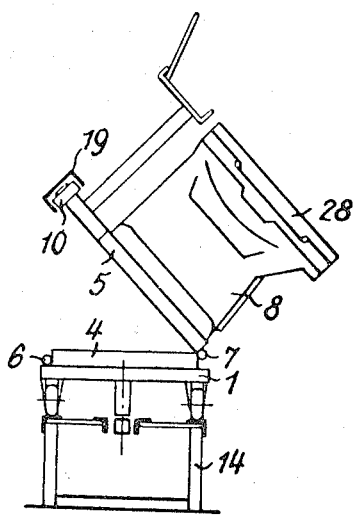
FIGS. 8 and 9 are cross-sectional views of FIG. 5 taken along the lines VIII—VIII and IX—IX thereof.
Figure 9:
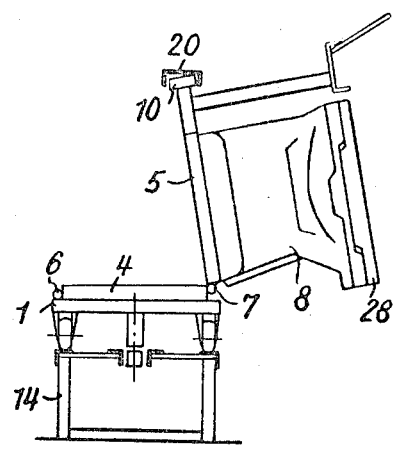

After the slip has been removed from the pan, the mold is tilted in the opposite direction by the apparatus illustrated in FIGS. 5, 6, 8, and 9. In these figures, it will be observed that a guideway 12 of U-shaped configuration is provided with a complex curve which tilts the upper frame 5 relative to the frame 4 and at the same time precisely controls the tilting motion. The guideway 12 includes an initial ascending section 19 which curves upwardly from a position adjoining the upper rail 13 as viewed in FIG. 6, and then inwardly to a position above and overlying track 14. The second section 20 of the guideway 12 is essentially linear while the third section 21 curves downwardly and outwardly so that it is essentially symmetrical with the guideway section 19. The guideway sections 19 and 21 are formed of individual portions 22 and 23, respectively, which are hingeably mounted at 24 and 25 to a base adjoining track 14. This arrangement permits the sections 22 and 23 of the guideway 12 to be displaced outwardly relative to the upper rail 13 of the track 14 as shown in FIG. 6 in order to permit the passage of empty molds without subjecting them to the tilting operation. As a carriage with a mold approaches the guideway section 12, the roller 10 engages the inclined guideway section 19, as illustrated in FIG. 8, and tilts the mold 8 to the right, as shown in that figure. Since the guideway 12 is in the form of a channel, it engages the roller 10 and controls the tilting action. In this way, the mold can be tilted through an angle of at least 80°, as observed in FIG. 9, in order to completely empty excess slip from the toilet bowl trap. The guideway section 21 then returns the mold to the horizontal position as the carriage moves in the direction of the arrow F, as shown in FIG. 6.

With all of the excess slip removed from the mold 8, the mold 8 can be lifted from the carriage and the ceramic article thus formed removed from within the mold. For convenience, the arm extending from the frame 5, which carries the roller 10, is provided with a collar 27 carrying a tubular member 26 extending upwardly therefrom and supporting a rack 29. The rack 29 is used to hold the top portion 28 of the mold 8 which the latter is removed prior to disengagement of the mold 8 from the frame 5 to facilitate removal of the ceramic article from the mold.

While only one embodiment of the invention has been illustrated and described, it is apparent that alterations, modifications and changes may be made therein without departing from the true scope and spirit thereof as defined by the appended claims.

What is claimed is:
1. Apparatus for molding ceramic articles such as toilet bowls and the like embodying traps comprising a mold supporting carriage, conveying means supporting and transporting said carriage, said carriage including a base, a first frame overlying and hinged at one edge to said base, a second frame overlying said first frame and hinged to the opposing edge of said first frame, a ceramic mold releasably secured to said second frame, said mold being adapted to retain ceramic slip to form a ceramic article embodying a trap, guideway means associated with said track and actuating means carried by said frames and cooperating with said guideway means for selectively operating and successively tilting said frames first in one direction about one hinged edge and then in the other direction about the other hinged edge to first tilt the mold in one direction and then in the opposite direction to effect removal of all excess slip from the article and trap forming part thereof.

2. Apparatus for molding ceramic articles according to claim 1 wherein axes of said hinged edges are disposed in parallel relationship to the direction of movement of said carriage.

3. Apparatus for molding ceramic articles according to claim 2 wherein the actuating means of said second frame extends outwardly therefrom and said guideway means for engaging the last said actuating means for tilting at least said second frame relative to said first frame is positioned along side said track.

4. Apparatus for molding ceramic articles according to claim 3 wherein the actuating means for said first frame extends downwardly therefrom and said guideway means engaging the last said actuating means for tilting both of said frames relative to said base is positioned between the rails of said track.

References Cited
UNITED STATES PATENTS

| | | | |
|---|---|---|---|
| 3,448,497 | 6/1969 | Arnold | 25—2X |
| 2,431,174 | 11/1947 | Henry | 214—62(A) |
| 3,211,305 | 10/1965 | Davenport | 214—62 |
| 3,358,858 | 12/1967 | Zabel | 214—62 |
| 3,360,106 | 12/1967 | Harrison | 214—62X |

FOREIGN PATENTS

| | | | |
|---|---|---|---|
| 80,922 | 7/1920 | Austria | 214—62(A) |

CHARLES W. LANHAM, Primary Examiner

B. D. TOBOR, Assistant Examiner

U.S. Cl. X.R.

214—62; 264—302